(12) United States Patent
Jung et al.

(10) Patent No.: US 8,861,842 B2
(45) Date of Patent: Oct. 14, 2014

(54) METHOD AND APPARATUS FOR REAL-TIME PEDESTRIAN DETECTION FOR URBAN DRIVING

(75) Inventors: Sang-Hack Jung, Jersey City, NJ (US); Mayank Bansal, Plainsboro, NJ (US); Bogdan Calin Mihai Matei, Princeton Junction, NJ (US); Jayan Eledath, Princeton, NJ (US); Harpreet Singh Sawhney, West Windsor, NJ (US); Rakesh Kumar, West Windsor, NJ (US); Raia Hadsell, Princeton Junction, NJ (US)

(73) Assignee: SRI International, Menlo Park, CA (US)

( * ) Notice: Subject to any disclaimer, the term of this patent is extended or adjusted under 35 U.S.C. 154(b) by 694 days.

(21) Appl. No.: 13/022,118

(22) Filed: Feb. 7, 2011

(65) Prior Publication Data

US 2011/0255741 A1 Oct. 20, 2011

Related U.S. Application Data

(60) Provisional application No. 61/301,807, filed on Feb. 5, 2010.

(51) Int. Cl.
*G06K 9/00* (2006.01)
(52) U.S. Cl.
CPC ........ *G06K 9/00805* (2013.01); *G06K 9/00369* (2013.01)
USPC ........................................ 382/155

(58) Field of Classification Search
None
See application file for complete search history.

(56) References Cited

U.S. PATENT DOCUMENTS

| 6,956,469 | B2 * | 10/2005 | Hirvonen et al. | 340/435 |
| 8,229,164 | B2 * | 7/2012 | Miyamoto et al. | 382/103 |
| 8,385,599 | B2 * | 2/2013 | Camus et al. | 382/104 |

OTHER PUBLICATIONS

Fast Human detection using a cascade of histograms of oriented gradients, by Zhu et al., Mitsubishi research laboratoriesl Inc., 2006.*

* cited by examiner

*Primary Examiner* — Vikkram Bali
(74) *Attorney, Agent, or Firm* — Moser Taboada

(57) ABSTRACT

A computer implemented method for detecting the presence of one or more pedestrians in the vicinity of the vehicle is disclosed. Imagery of a scene is received from at least one image capturing device. A depth map is derived from the imagery. A plurality of pedestrian candidate regions of interest (ROIs) is detected from the depth map by matching each of the plurality of ROIs with a 3D human shape model. At least a portion of the candidate ROIs is classified by employing a cascade of classifiers tuned for a plurality of depth bands and trained on a filtered representation of data within the portion of candidate ROIs to determine whether at least one pedestrian is proximal to the vehicle.

27 Claims, 15 Drawing Sheets

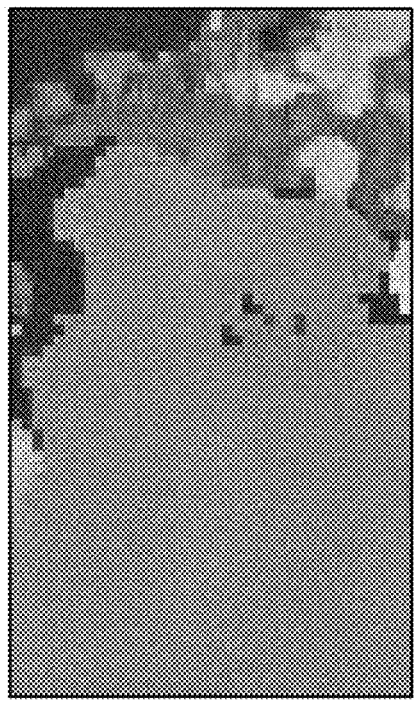
FIG. 5A  FIG. 5B
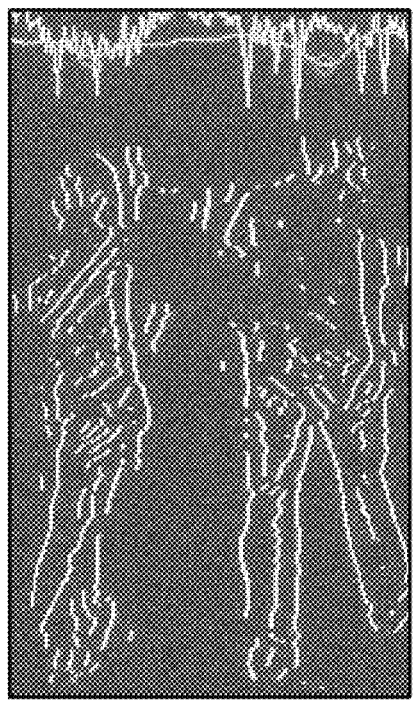
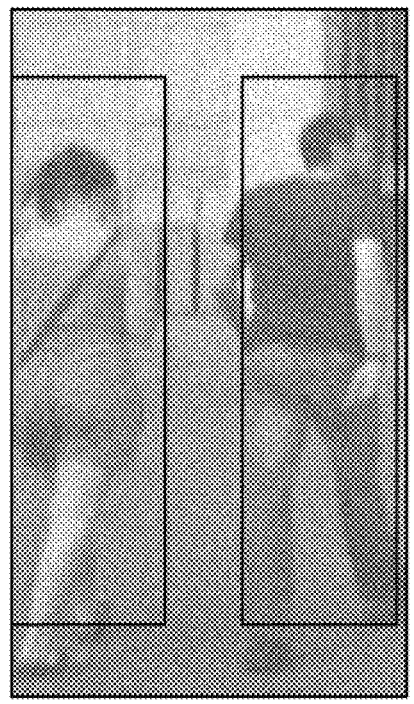
FIG. 5C  FIG. 5D

Algorithm 1 Patch Classification using Vertical Support

```
for all patches pᵢ ∈ Π do
    if L(pᵢ) ∉ {INV, BGR, GND} then
        if Supported(pᵢ, h_mid) then
            L(pᵢ) ← TVS
        end if
    end if
    if L(pᵢ) ∉ {INV, BGR, GND, CAN, TVS} then
        if Supported(pᵢ, h_up) then
            L(pᵢ) ← OHG
        end if
    end if
    if L(pᵢ) ∈ {CAN} then
        if ¬ Supported(pᵢ, h_low) then
            L(pᵢ) ← INV
        end if
    end if
end for
```

FIG. 7

METHOD AND APPARATUS FOR REAL-TIME PEDESTRIAN DETECTION FOR URBAN DRIVING

GOVERNMENT RIGHTS IN THIS INVENTION

This invention was made with U.S. government support under contract number DTFH61-07-H-00039. The U.S. government has certain rights in this invention.

CROSS-REFERENCE TO RELATED APPLICATION

This application claims the benefit of U.S. provisional patent application No. 61/301,807 filed Feb. 5, 2010, the disclosure of which is incorporated herein by reference in its entirety.

FIELD OF THE INVENTION

The invention relates generally to vision systems. More specifically, the invention relates to a method and system for detecting a pedestrian crossing the path of a moving vehicle.

BACKGROUND OF THE INVENTION

In the United States alone, according to the National Highway Traffic Association, there were over 180,000 pedestrian fatalities between 1975 and 2005, accounting for 11 percent of total motor vehicle casualties. The majority of pedestrian related accidents occur in urban areas where a pedestrian may dash in front of a vehicle, leaving an inattentive driver with very little time to react and to avoid hitting the pedestrian. As a result, there is a need in the art for an automated driver assistance apparatus and method that alerts a driver in a moving vehicle if and when a pedestrian may cross the path of the moving vehicle.

Computer vision systems and method provide a relatively inexpensive means of sensing pedestrians from within a vehicle, offering a wider field of view and higher resolution compared to radar systems currently in use in high-end automobiles. More particularly, stereo vision systems are superior to monocular vision systems since stereo vision systems permit calculation of distances to a target pedestrian by employing relatively high resolution 3D depth maps.

In an article by B. Leibe, N. Cornelis, and L. V. G. K. Cornelis, titled, "*Dynamic 3d scene analysis from a moving vehicle*," CVPR, 2007 (hereinafter "Leibe et al."), a stereo based system for 3D dynamic scene analysis from a moving vehicle is described that integrates sparse 3D structure estimation with multi-cue image based descriptors to detect pedestrians. Leibe et al. shows that employing sparse 3D structure significantly improves the performance of a pedestrian detector. Unfortunately, the best performance cited is 40% probability of detection at about 1.65 false positives per image frame.

In an article by D. M. Gavrila and S. Munder, titled, "*Multi-cue pedestrian detection and tracking from a moving vehicle*," IJCV, 73:41-59, 2007 (hereinafter "Gavrila and Munder"), a realtime stereo system for pedestrian detection and tracking is proposed called PROTECTOR. PROTECTOR employs sparse stereo to generate putative pedestrian regions-of-interest (ROIs) in an image, which are subsequently pruned using shape (contour) and texture information. The choice of sparse/dense stereo processing stages is justified based on real-time limitations in stereo computation for an entire image. Gavrila and Munder reports a 71% pedestrian detection performance at a 0.1 false alarms/frame without using a temporal constraint with pedestrians located less than 25 meters from the cameras. Temporal information is also employed to increase the reliability of the system and to mitigate missing detections, albeit at the price of increased latency of alerting the driver.

A real-time, monocular vision system for pedestrian detection known in the art has been proposed in an article by A. Shashua, Y. Gdalyahu, and G. Hayun, titled, "*Pedestrian detection for driver assistance systems: Single-frame classification and system level performance*," in Proc. of the IEEE Intelligent Vehicle Symposium, 2004, (hereinafter "Shashua et al."). Shashua et al. employs a focus of attention mechanism to detect window candidates very rapidly. The window candidates (approximately 70 per frame) are classified into pedestrian or non-pedestrians using a two-stage classifier. Each input window is divided in 13 image sub-regions. At each region, a histogram of image gradients is computed and used to train a support vector machine (SVM) classifier. The training data is divided into 9 mutually exclusive clusters to account for pose changes in the human body. The 13×9 dimensional vector containing the response of the SVM classifiers for each 9 training clusters is used to train an AdaBoost second-stage classifier. A practical pedestrian awareness system needs to produce very few false positive per hour of driving, hence Shashua et al. employs temporal information to improve the per-frame pedestrian detection performance and to separate between in-path and out-of-path pedestrian detections.

3D systems and methods known in the art may provide a low false positive rate at the expense of speed, while 2D methods and system have been shown to produce low false positive rate and high detection rates. Accordingly, what would be desirable, but has not yet been provided, is a 3D method and system for detecting pedestrians from moving vehicles in cluttered environments having low false positives and high detection rates, while maintaining real-time processing speed.

SUMMARY OF THE INVENTION

The above-described problems are addressed and a technical solution is achieved in the art by providing a computer implemented method for detecting the presence of one or more pedestrians in the vicinity of the vehicle, comprising the steps of: receiving imagery of a scene from one or more image capturing devices; deriving a depth map and appearance information (i.e., color and intensity) from the imagery; detecting a plurality of pedestrian candidate regions of interest (ROIs) from the depth map by matching each of the plurality of ROIs with a 3D human shape model; and classifying at least a portion of the candidate ROIs by employing the appearance information via a cascade of classifiers tuned for a plurality of depth bands and trained on a filtered representation of data within the portion of candidate ROIs to determine whether at least one pedestrian is proximal to the vehicle. The filtered representation may be a combination of pedestrian contour and gradient features or be based on deep learning classifiers. The deep learning classifiers may form a multi-layer convolutional network.

According to an embodiment of the present invention, the plurality of depth bands may be obtained at a plurality of disjoint image resolutions. The aforementioned image capturing devices are those that support derivation of three-dimensional (3D) information, such as a pair of stereo cameras, a LIDAR device, a SONAR device, a radar device, a photogrammetry device, or any other passive or active ranging device or devices.

According to an embodiment of the present invention, contour-based classifiers are employed for a depth of a candidate ROI closer than or equal to a predetermined distance and histogram of oriented gradients (HOG)-based classifiers are employed for a depth greater than the predetermined distance. The use of contour matching and histogram of oriented gradients descriptors helps to improve performance over HOG-based classifiers alone by using contour information to separate foreground pixels from background/noise pixels, thus making for a better classifier.

According to an embodiment of the present invention, the contour-based classifiers are each trained based on the steps of: dividing a candidate ROI into a plurality of sub-ROIs; refining each of the sub-ROIs by means of contour template matching; composing a foreground mask from contour template matching; and applying an HOG-based classifier to the sub-ROIs based on the refined sub-ROIs and the foreground mask. Contour template matching is achieved by chamfer matching.

According to an embodiment of the present invention, the cascade of classifiers tuned for several depth bands comprising contour-based classifiers and HOG-based classifiers may be replaced with a multi-layer convolutional network. The multi-layer convolutional network may comprise at least one each of a convolution layer, a pooling layer, and a fully connected network layer. The convolutional layer applies a set of learned filters to an input ROI using a sliding-window convolution. to extract features from the input ROI. The pooling layer combines input features within fixed neighborhoods using an averaging function followed by a coefficient multiplier and additive bias. The fully connected layer includes a set of hidden nodes, each of which has a single trainable weight for each input feature.

Training the convolutional network is a stochastic process, during which a set of labeled ROIs is forward propagated and then backward propagated though the network, after which trainable parameters are adjusted, and then the forward and reverse propagation is repeated until the trainable parameters converge.

The candidate ROIs may be pruned and labeled by classification into one of a plurality of human or non-human structures based in part on vertical support histograms. Classification into one of a plurality of human or non-human structures comprises: creating a 2D grid of tiles along image coordinates; for each tile, fitting a patch grid from a planar total least squares estimate; rejecting patches as invalid from the patch grid that having less than a predetermined number of 3D points or having less than a predetermined number of inliers; rejecting patches as ground or below ground according to their position and normal direction; and classifying and labeling each of the remaining patches as one of a tall vertical structure, an overhanging structure, and a candidate based on the vertical support histograms.

According to an embodiment of the present invention, an output of matching each of the plurality of ROIs with a 3D human shape model may be a correlation score map. A plurality of peaks in the correlation score map is selected by nonmaximal suppression. An area about each of the plurality of peaks of the correlation score map is projected into the image to obtain an initial pedestrian candidate ROI set.

According to an embodiment of the present invention, the candidate ROIs corresponding to non-pedestrians may be partially pruned from the initial pedestrian ROI candidate set by removing regions that have more than a predetermined percentage of overlap with existing detections. The partially pruned candidate ROIs are further pruned by examining a combination of depth and edge features of two individual pedestrian detections. Examining a combination of depth and edge features of two individual pedestrian detections further comprises the steps of: computing a Canny edge map is computed for each candidate pedestrian ROI; rejecting edge pixels that are further than a predetermined distance from an expected disparity; obtaining a vertical projection of remaining edges, resulting in a 1D profile from which peaks are detected using mean-shift; at each detected peak, initializing a new pedestrian ROI and refined it horizontally and then vertically to obtain a centered bounding box about a pedestrian candidate ROI; and, removing any resulting overlapped pedestrian candidate ROIs from the initial pedestrian ROI candidate set.

BRIEF DESCRIPTION OF THE DRAWINGS

The present invention will be more readily understood from the detailed description of exemplary embodiments presented below considered in conjunction with the attached drawings in which like reference numerals refer to similar elements and in which:

FIGS. 5A-5D are visual depictions of an example of pedestrian ROI refinement, according to an embodiment of the present invention;

FIG. 7 is a listing of pseudo-code for patch classification using verticle support, according to an embodiment of the present invention;

It is to be understood that the attached drawings are for purposes of illustrating the concepts of the invention and may not be to scale.

DETAILED DESCRIPTION OF THE INVENTION

Embodiments of the present invention employ an exemplary 3D method and real-time system for detecting a pedestrian in the vicinity of the vehicle. In order to balance the trade-off between computational complexity, low false alarms, and high detection accuracies, according to an embodiment of the present invention, the present system and method implement a number of novel techniques, including: (1) the detection and classification of clutter objects in roadside scenarios such as buildings, trees, and poles by employing dense stereo depth maps to substantially lower false alarms rates; (2) multiple classifiers adapted to a plurality of ranges of distances to increase detection accuracy; and (3) a combination of template matching with 2D human shape contour fragments employed for localization along with the use of standard histogram of oriented gradient (HOG) descriptors for guiding a driver's focus of attention and for computational efficiency while maintaining accuracy. The present invention has been tested for in a variety of urban scenarios for tens of hours of driving, yielding over 90% pedestrian recognition rates, at distances between 0 and 40 meters in front of a vehicle, while having less than a 0.3 false positive rate per frame.

The term "computer" or "computer platform" is intended to include any data processing device, such as a desktop computer, a laptop computer, a mainframe computer, a server, a handheld device, a digital signal processor (DSP), an embedded processor (an example of which is described in connection with FIG. 2 hereinbelow), or any other device able to process data. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, automotive CAN bus, OTA (over-the-air transmission, ATSC, DVB-T), video over packet-switched networks (TCP/IP, e.g., the Internet), satellite (microwave, MPEG transport stream or IP), direct broadcast satellite, analog cable transmission systems (RF), digital video transmission systems (ATSC, HD-SDI, HDMI, DVI, VGA), etc.

Figure 1:
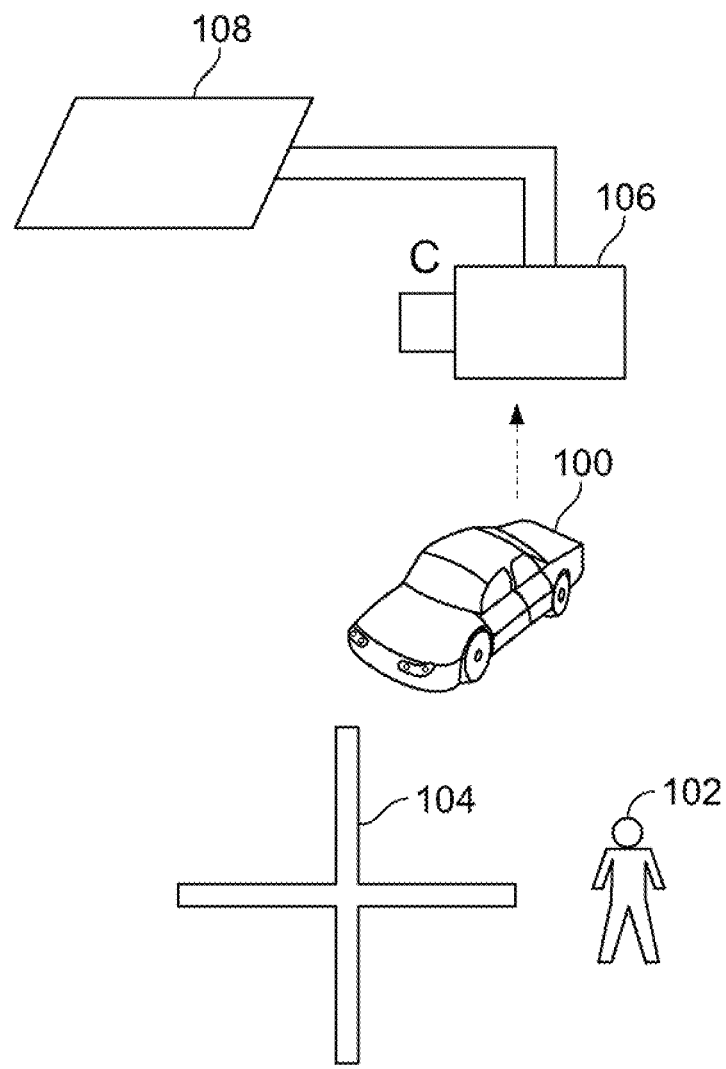
FIG. 1 depict a vehicle that is equipped with an exemplary digital processing system configured to acquire a plurality of images and to detect the presence of one or more pedestrians in the vicinity of the vehicle, according to an embodiment of the present invention.

FIG. 1 depicts a vehicle 100 that is equipped with an exemplary digital processing system 110 configured to acquire a plurality of images and detect the presence of one or more pedestrians 102 in a scene 104 in the vicinity of the vehicle 100, according to an embodiment of the present invention. The vehicle 100 may include one or more suitable calibrated stereo (3D) image capturing devices 106 for capturing visual information (e.g., one or more still or video cameras, shape cameras, LIDAR or IR photogrammetry-generated range data) mounted on a rigid or semi-rigid platform 108, preferably behind the rear-view minor of the vehicle 100. Suitable image capturing devices 106 may comprise, for example, 3D cameras with embedded transmission functions, camera transceiver systems, a video encoding appliance, a video statistical multiplexing appliance (statmux), computers with video capture cards, computers with attached cameras media servers that are spooling/streaming video files, PCs that are spooling/streaming video files, PCs, tablets, mobile phones, PDAs, video decoding appliances, video demultiplexing appliances, televisions, and television distribution devices (e.g., AppleTV™).

Figure 2:
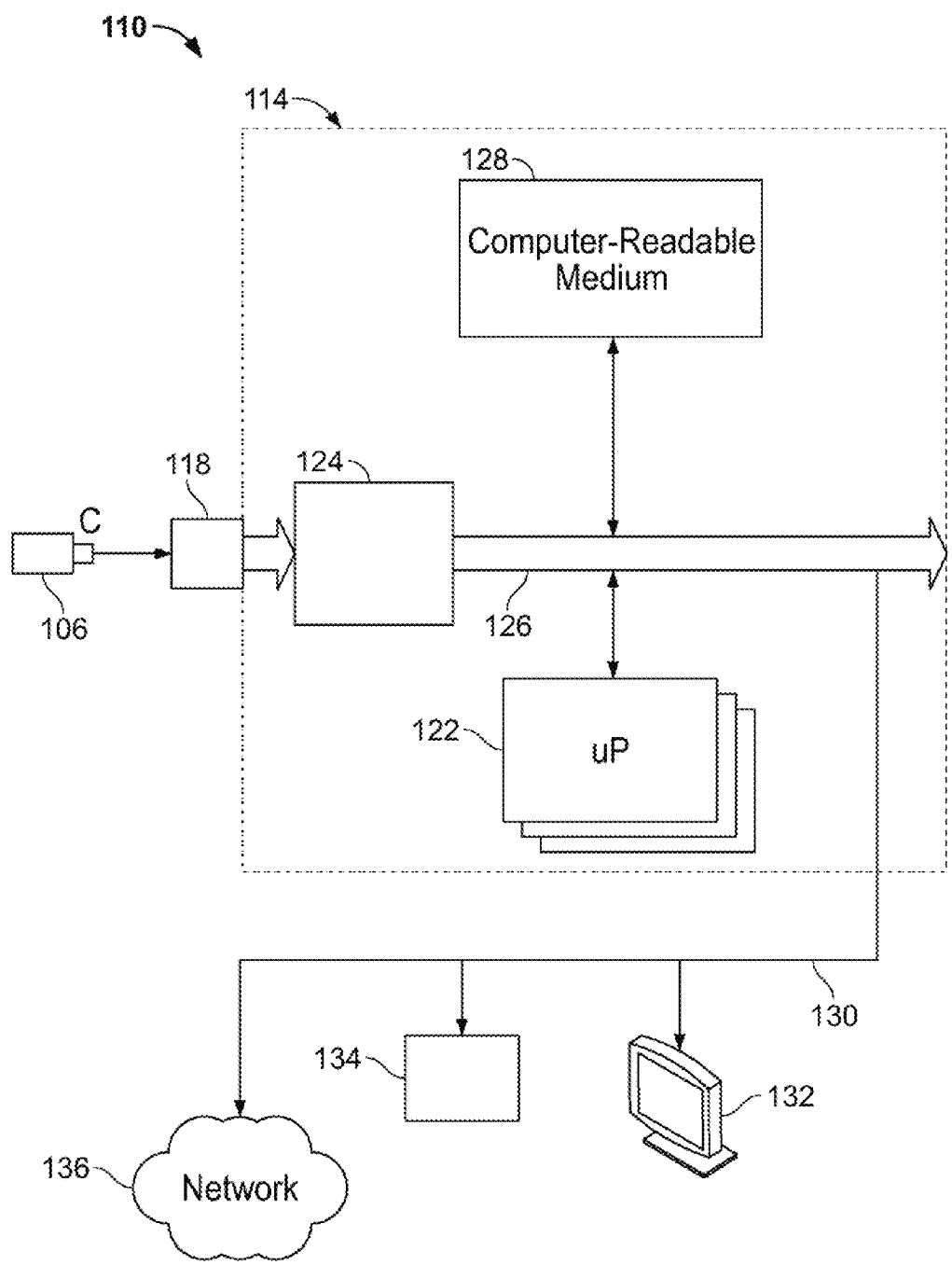
FIG. 2 is a hardware block diagram of an exemplary digital processing system of FIG. 1 for detecting and classifying one or more pedestrians in the vicinity of the vehicle captured by one or more image capturing devices, according to an embodiment of the present invention.

FIG. 2 is a hardware block diagram of an exemplary digital processing system 110 for detecting and classifying one or more pedestrians in the vicinity of the vehicle 100 captured by one or more image capturing devices 106, according to an embodiment of the present invention. By way of a non-limiting example, the system 110 receives digitized video from the one or more image capturing devices 106 (e.g., stereo cameras). The system 110 may include an on-board computing platform 114. The system 110 may optionally include a digital video capture system 118. The digital video capturing system 118 processes streams of digital video, or converts analog video to digital video, to a form which can be processed by the computing platform 114.

The digital video capturing system 118 may be stand-alone hardware, or cards such as Firewire cards which can plug-in directly to the computing platform 114. The computing platform 114 may include one or more embedded controllers, a personal computer, or a work-station (e.g., a Pentium-M 1.8 GHz PC-104 or higher) comprising one or more processors 122 which includes a bus system 124 which feeds a video/audio data streams 126 to the one or more processors 122 or directly to a computer-readable medium 128. Alternatively, the computing platform 114 may be implemented as or part of an integrated circuit, such as a graphics processing unit (GPU) or digital signal processor (DSP) implemented in an FPGA or ASIC.

The computer readable medium 128 may also be used for storing the instructions of the system 110 to be executed by the one or more processors 122, including an optional operating system, such as the Windows or the Linux operating system. The computer readable medium 128 may further be used for the storing and retrieval of processed video and/or of the present invention in one or more databases. The computer readable medium 128 may include a combination of volatile memory, such as RAM memory, and non-volatile memory, such as flash memory, optical disk(s), and/or hard disk(s). Portions of a processed video/audio data stream 130 may be stored temporarily in the computer readable medium 128 for later output to an on-board monitor 132, to an on-board automatic collision avoidance system 134, or to a network 136, such as the Internet.

Data are preferably processed by computing platform 114 at 30 fps, wherein the at least one processor 122 computes dense disparity maps at multiple resolution scales, using a pyramid image representation and a SAD-based stereo matching algorithm. The disparities (i.e., depth images) are generated at three different pyramid resolutions. Disparity and depth images are referred to interchangeably.

Figure 3:
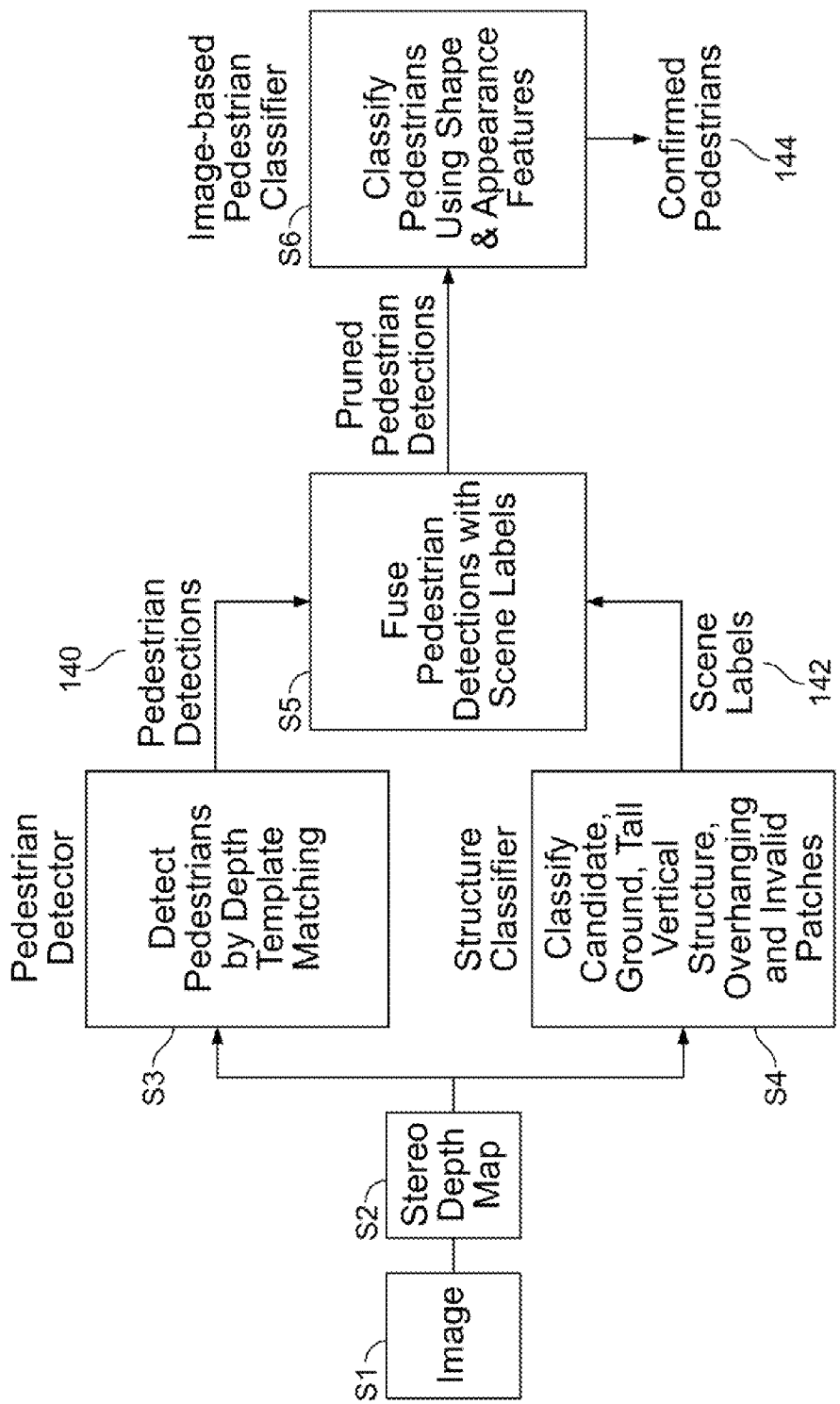
FIG. 3 is a block diagram illustrating exemplary software modules that execute the steps of a method for detecting a pedestrian in the vicinity of the vehicle, according to an embodiment of the present invention.

FIG. 3 is a block diagram illustrating exemplary software modules that execute the steps of a method for detecting a pedestrian in the vicinity of the vehicle, according to an embodiment of the present invention. Referring now to FIGS. 1-3, in block S1, at least one image of the scene is received by one or more image capturing devices 106 from the vehicle 100. In block S2, at least one stereo depth map is derived from the at least one image. In a preferred embodiment, disparities are generated at a plurality of pyramid resolutions, preferably three—Di, i=1, . . . , 3, with D0 being the resolution of the input image.

In block S3, a pedestrian detector (PD) module generates pedestrian candidate regions in the at least one image by matching pedestrian candidate regions with a 3D human shape model. In one preferred embodiment, the PD module takes the individual disparity maps Di, i=1, . . . , 3 and converts each individual depth map into a depth representation. The resulting depth images of candidate pedestrian detections 140 are used separately to detect pedestrians using template matching based on the 3D human shape model to be described hereinbelow.

In block S4, a structure classification (SC) module employs a combined image derived from the pyramid of depth images, D0+D1+D2, to classify image regions into several broad categories such as tall vertical structures, overhanging structures, ground, and poles and to remove pedestrian candidate regions having a significant overlap. These image regions classified as non-pedestrians are provided with scene labels 142. In block S5, the scene labels 142 are fused with the pedestrian candidate regions to produce a pruned set of pedestrian regions-of-interest (ROIs). In block S6, a pedestrian classification (PC) module takes in the list of pedestrian ROIs and confirms valid pedestrian detections 144 by using a cascade of classifiers tuned for several depth bands and trained on a combination of pedestrian contour and gradient features.

Figure 4:
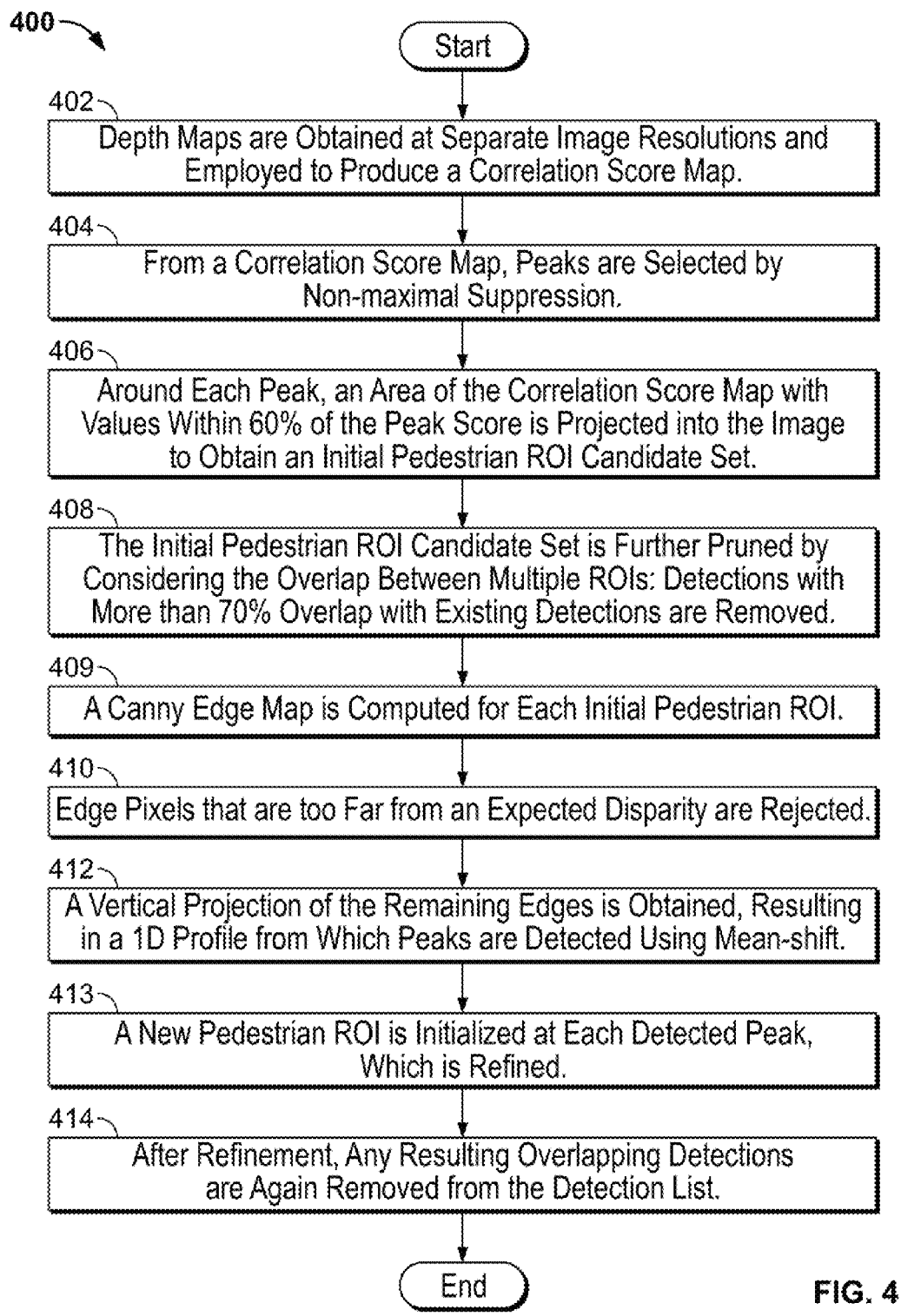
FIG. 4 depicts exemplary steps executed by the pedestrian detector (PD) module of FIG. 3 in greater detail, according to an embodiment of the present invention.

FIG. 4 depicts exemplary steps executed by the pedestrian detector (PD) module 400 in greater detail, according to an embodiment of the present invention. In the PD module 400, template matching is conducted using a 3D pedestrian shape template applied to a plurality (e.g., three) disjoint range bands in front of the vehicle 100. The 3D shape size is a predetermined function of the actual range from the image capturing devices 106.

As mentioned above, in step 402, depth maps are obtained at separate image resolutions, D1, i=1, . . . , 3. For the closest range band, the coarsest depth map (D2) is employed, for the next band level, D1, and for the furthest band the finest depth map, D0. This ensures that at each location on a horizontal grid only the highest resolution disparity map that is "dense enough" is used. The output of this template matching is a correlation score map (over a horizontal 2D grid) from which, in step 404, peaks are selected by nonmaximal suppression as described in an article by P. Chang, D. Hirvonen, T. Camus, and B. Southall, titled "*Stereo-based object detection, classification, and quantitative evaluation with automotive applications*," IEEE International Workshop on Machine Vision for Intelligent Vehicles, San Diego, 2005 (hereinafter "Chang et al."). To ensure very small pedestrian miss rates, a larger number of peaks may be obtained by non-maximal suppression. In step 406, around each peak, an area of the correlation score map with values within a predetermined percentage (e.g., 60%) of the peak score is projected into the image to obtain an initial pedestrian ROI candidate set. In step 408, this set is further pruned by considering the overlap between multiple ROIs: detections with more than a predetermined percentage of overlap (e.g., 70%) with existing detections are removed.

FIGS. 5A-5D are visual depictions of an example of pedestrian ROI refinement, according to an embodiment of the present invention. Depth map based detected ROIs are further refined by examining a combination of depth and edge features of two individual pedestrian detections in FIGS. 5A-5D. Referring now to FIGS. 4 and 5A-5D, in step 409, a Canny edge map is computed for each initial pedestrian ROI. In step 410, edge pixels that are too far from an expected disparity are rejected. In step 412, a vertical projection of the remaining edges is obtained, resulting in a 1D profile (shown as reference "Y" in FIG. 5C) from which peaks are detected using mean-shift as described in an article by D. Comaniciu and P. Meer, titled "*Mean shift: A robust approach toward feature space analysis*," PAMI, 24:603-619, 2002. In step 413, a new pedestrian ROI is initialized at each detected peak, which is refined first horizontally and then vertically to obtain a more centered and tightly fitting bounding box about a candidate pedestrian. This involves employing vertical and horizontal projections, respectively, of binarized disparity maps (similar to using the edge pixels above) followed by detection of peak and valley locations in the computed projections. After this refinement, in step 414, any resulting overlapping detections are again removed from the detection list.

Figure 6:
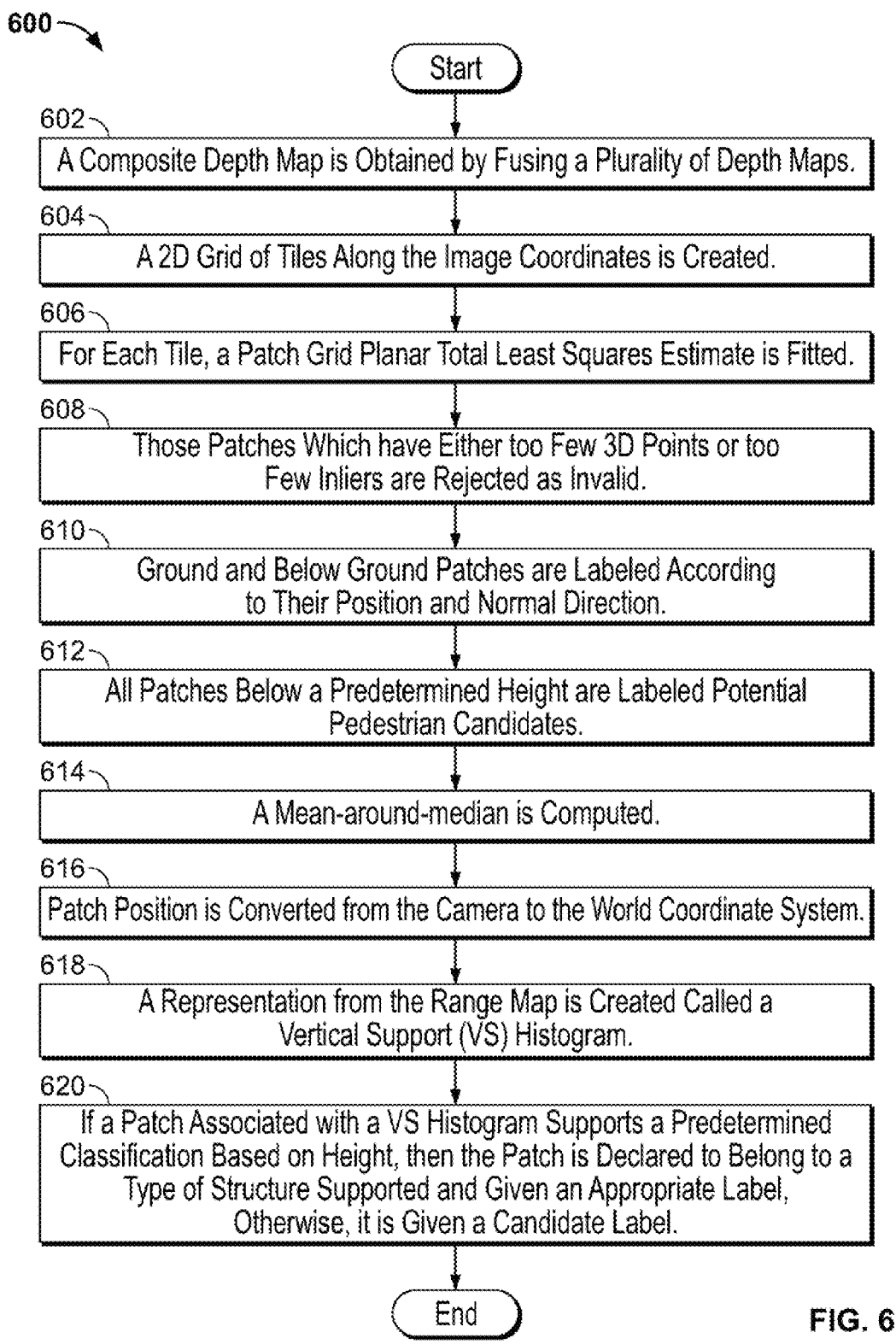
FIG. 6 depicts exemplary steps executed by the structure classification (SC) module 600 in greater detail, according to an embodiment of the present invention.

To reduce the number false pedestrian detections, candidate pedestrian ROIs may be classified as one of the aforementioned 3D structures using the structure classification (SC) module. FIG. 6 depicts exemplary steps executed by the structure classification (SC) module 600 in greater detail, according to an embodiment of the present invention. Before proceeding with a detailed description of the SC module 600, the following 3D structure classes are named: invalid (INV), ground (GND), below ground (BGR), tall vertical structure (TVS), overhanging (OHG) and candidates (CAN). Since the per-pixel range data is often noisy and sparse, the input disparity image is represented by a grid of planar patches as is described in an article by P. Chang, T. Camus, and R. Mandelbaum, titled, "*Stereo-based vision system for automotive imminent collision detection*," Intelligent Vehicles Symposium, 2004 IEEE, pages 274-279 (hereinafter "Chang2"), and then each of the planar patches is classified into one of the predefined classes.

To classify structure, in Step 602, a composite depth map D is obtained by fusing the plurality of (e.g., three) depth maps Di, i=1, . . . , 3 to minimize holes and ensure a stable depth estimate at all the depth bands in front of the image capturing devices 106. In step 604, a 2D grid of tiles along the image coordinates is created as described in Chang2, and in step 606, for each tile, a patch grid planar total least squares estimate is fitted as described in an article by V. Huffel and J. Vandewalle, titled "*The total least squares problem: computational aspects and analysis,*". Soc. for Industrial and Applied Math (SIAM), 1991. Once the patch grid planar estimates are available, in step 608, those patches which have either too few (i.e., below a predetermined number of) 3D points or too few (i.e., below a predetermined number of) inliers (from the plane fitting process) are rejected as invalid (label INV), and then in step 610, ground and below ground patches (GND or BGR) are labeled according to their position and normal direction. In step 612, all patches below a predetermined height (e.g., less than 4 m) are labeled potential pedestrian candidates CAN. The patch position plays a key role in this classification and subsequent labeling, hence a robust estimation for patch position is required. A number of different robust depth measures have been tested and a mean-around-median has been found to be the most reliable. In step 614, a mean-around-median is computed by first defining a depth neighborhood around the median depth of all the inlier points (within a patch), and then choosing the average depth of inlier points that fall in this neighborhood. In step 616, the patch position is converted from the camera to the world coordinate system and all further processing is performed using the ($X_p^w, Y_p^w, Z_p^w$) position vector so obtained.

To further classify the patches, in step 618, a representation from the range map is created called a vertical support (VS) histogram as described in copending, commonly owned, U.S. patent application Ser. No. 12/578,440, filed Oct. 13, 2009, and titled "System and Method of Detecting Objects," the disclosure of which is incorporated by reference herein in its entirety. More particularly, a discrete 2D grid of the world X-coordinates and the world disparities is defined. Each point from the range map which satisfies a given distance range and a given height range is projected to a cell on the grid and its height recorded. For each bin, the variance of heights of all the points projected in the bin is computed. This provides a 2D histogram in X-d coordinates which measures the support at a given world location from any visible structure above it. To handle slightly slanted structures, the histogram is smoothed adaptively according to distance from the camera. In an embodiment, a plurality of (e.g., three) different VS histograms may be created over the same distance range each having different height bands. Each histogram captures the spread of heights from any structure completely or partially within its height range. In step 620, if a patch associated with a VS histogram supports a predetermined classification based on height, then the patch is declared to belong to a type of structure supported and given an appropriate label, otherwise, it is given a candidate (CAN) label.

More particularly, let $\Pi$ represent the set of all patches obtained above and L be the label function L: $\Pi \rightarrow$ {INV, BGR, GND, CAN, TVS} which maps each patch to a label. Once the VS histograms are available, the steps in Algorithm 1 of FIG. 7 are followed to classify each non-ground patch into one of the remaining classes. Conceptually, any tall vertical structure should have support in the middle height band. If, however, it has support in the upper height band and not in the middle height band, it is an overhanging structure such as a bridge or tree branches. Care is taken to ensure that objects under an overhanging structure are still labeled as valid objects. Finally, any object patches without sufficient lower height band support may be rejected. The Supported( ) function takes a patch p and a VS histogram h and returns true if the histogram supports the given patch. More particularly, the width and height (in pixels) of the image tile defining p are back-projected into the world coordinate system using the mean-around-median depth for p. This provides an XZ region of space which is then mapped to a set of bins B in the histogram h. Let $B_v \subset B$ be the subset of bins where the histogram value $h_i > t$ for a threshold t(=0.1). Let n=|$B_v$| and N=|B| be the cardinalities of sets $B_v$ and B respectively and S=$\Sigma\{h_i | i \in B_v\}$. If either the valid bin density d=n/N is more than 25% or the score sum S is more than 1.0, it is considered acceptable support and true is returned.

According to an embodiment of the present invention, the pedestrian classification (PC) module may comprise a set of multi-range classifiers. Specifically, a plurality of classifiers (e.g., three) is trained for a plurality of distant interval (e.g., [0, 20], [20, 30], and [30, above]), where a specific layer is triggered based on the distance of a candidate pedestrian. Multi-range classification is preferred because conventional interlaced automotive grade cameras having a resolution of about 720×240 pixels typically produce pedestrian ROI sizes within a captured image that vary substantially. For example, a person in an image located 30 m or further from a camera comprises about 25 pixels or smaller. Thus, it is desirable to employ a plurality of classifiers each tuned to a specific resolution rather than employing a single classifier covering mixed resolutions. Each of the plurality of distance-specific classifiers comprises multiple cascade layers to efficiently remove false positives. For optimal performance, one type of classifier is employed at short range for low-latency detection, and one or more other types of classifiers are employed at corresponding longer ranges.

Figure 8A:
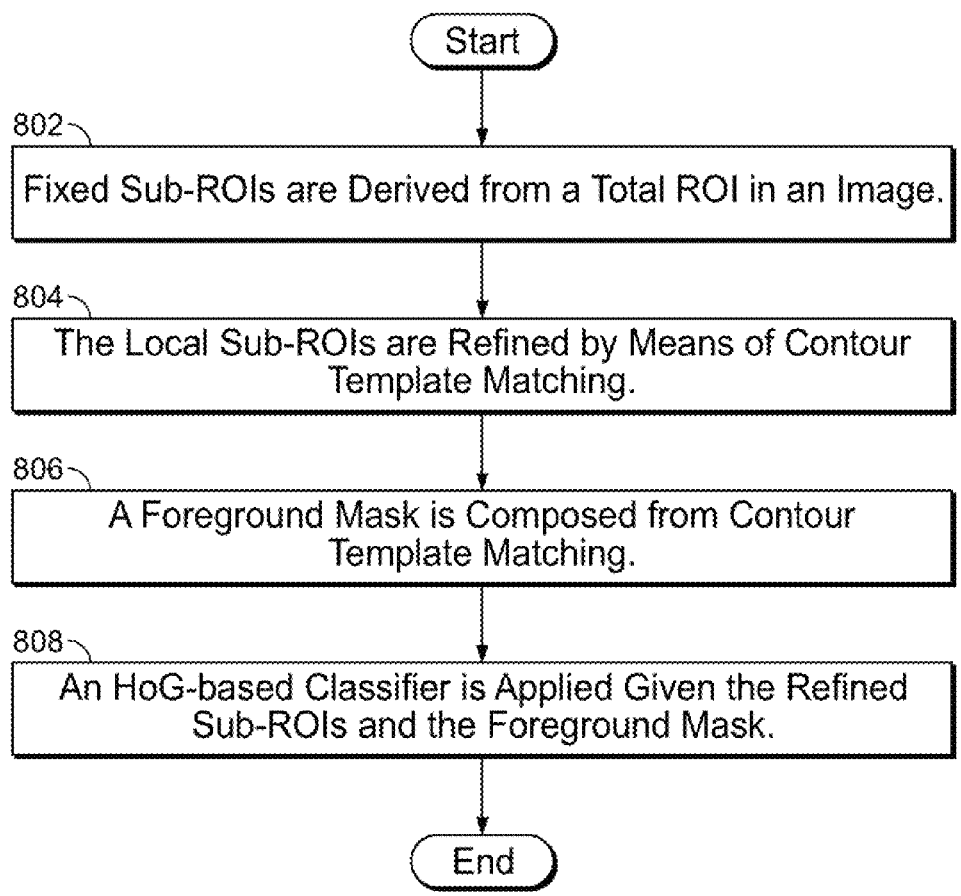
FIG. 8A depicts an exemplary flow for contour-based classification, according to an embodiment of the present invention.
Figure 8B:
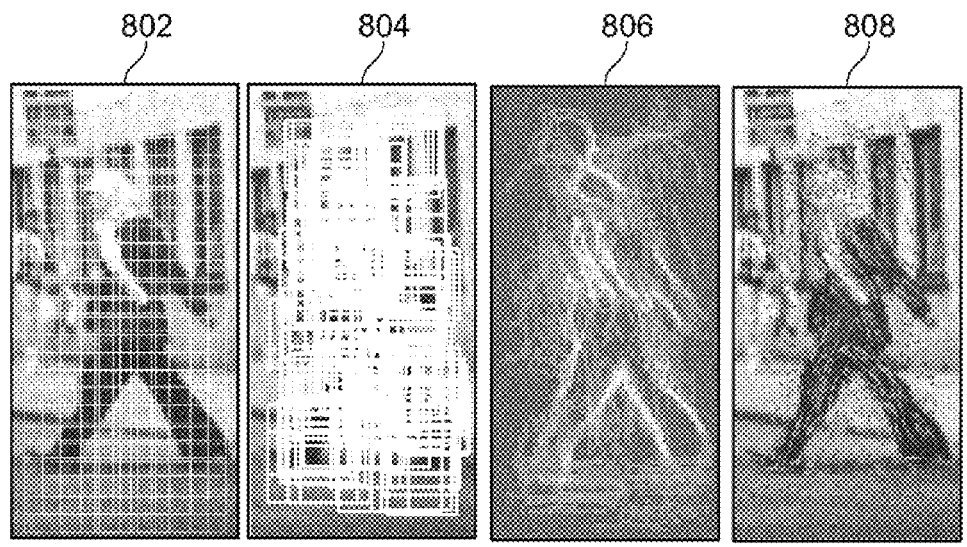
FIG. 8B depicts the steps of FIG. 8A visually, according to an embodiment of the present invention.
Figure 9:
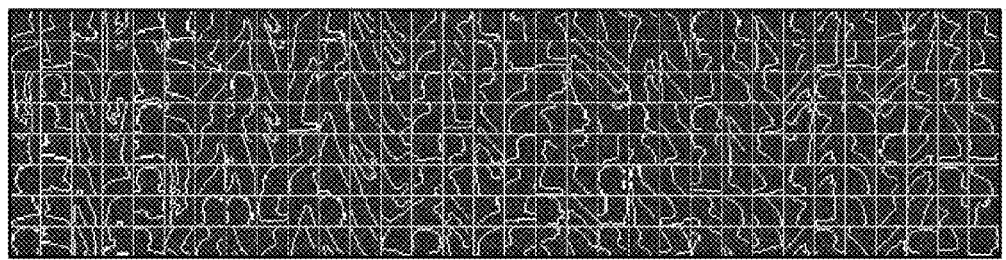
FIG. 9 displays examples of contour templates of different sub-ROIs of an overall ROI to be classified.

FIG. 8A depicts an exemplary flow for contour-based classification, according to an embodiment of the present invention. FIG. 8B depicts the steps of FIG. 8A visually, according to an embodiment of the present invention. The contour-based classifier is designed to reliably classify pedestrians with high resolution using a combination of contour templates and histogram of oriented gradients (HOG) descriptors. This serves the purpose of (1) local parts alignment and (2) background filtering. In step 802, fixed sub-ROIs are derived from a total ROI in an image. The fixed sub-ROIs are obtained from a collection of shape contours of a pedestrian template for each local feature window. That is, each feature window (i.e., sub-ROI) contains examples of contour models of underlying body parts that cover variations in poses and shapes. For example, a sub-ROI at a head position contains a set of head contours samples of different poses and shapes. FIG. 9 displays examples of contour templates of different sub-ROIs.

With a set of contour models, a global template search may be substituted with a plurality of searches at a local parts level, i.e., each local feature window may be searched in a limited range for locking on underlying local body parts. The part contour models comprise edge maps of representative examples. Each sub-ROI typically contains 5-12 contour templates. In step 804, the local sub-ROIs are refined by means of contour template matching. Contour template matching is achieved by chamfer matching. For each sub-ROI, a chamfer score is computed for each contour template model. A refined sub-ROI position is then obtained from a mean position of maximum chamfer scores from each contour template as shown in Equation 1 hereinbelow:

$$Ctr_{subROI}(i_{x,y}) = \alpha \sum_{i \in voc(ixy)} w_{ch}(i) Ctr_{Templ}(i; I_{ch}) M^{FG}(i_{x,y}) = \quad (1)$$

$$M^{FG}(i_{x,y}) + \alpha \sum_{i \in voc(ixy)} w_{ch}(i) I^{Cont}_{Templ}(i)$$

$$\text{where } \alpha = 1 \Big/ \sum_i w_{ch}(i)$$

Here, $Ctr_{subROI}(i_{x,y})$, $M^{FG}$ and $I_{Templ}^{Cont}$ denotes the center of a local sub-ROI, a foreground mask, and a binary contour template. $Ctr_{Templ}(i; I_{ch})$ is the center of chamfer matching score with the ith kernel image, respectively.

In step 806, a foreground mask is composed from contour template matching. More particularly, from the contour templates, the foreground mask is composed by overlapping binary local templates at each detected position that is weighted by matching scores. The foreground mask is used as a filter to suppress noisy background features prior to a classification step. In step 808, an HOG-based classifier is applied given the refined sub-ROIs and the foreground mask. More particularly, HOG feature descriptors are computed by employing the refined sub-ROI boxes, where gradient values are enhanced by the weighted foreground mask.

Figure 10:
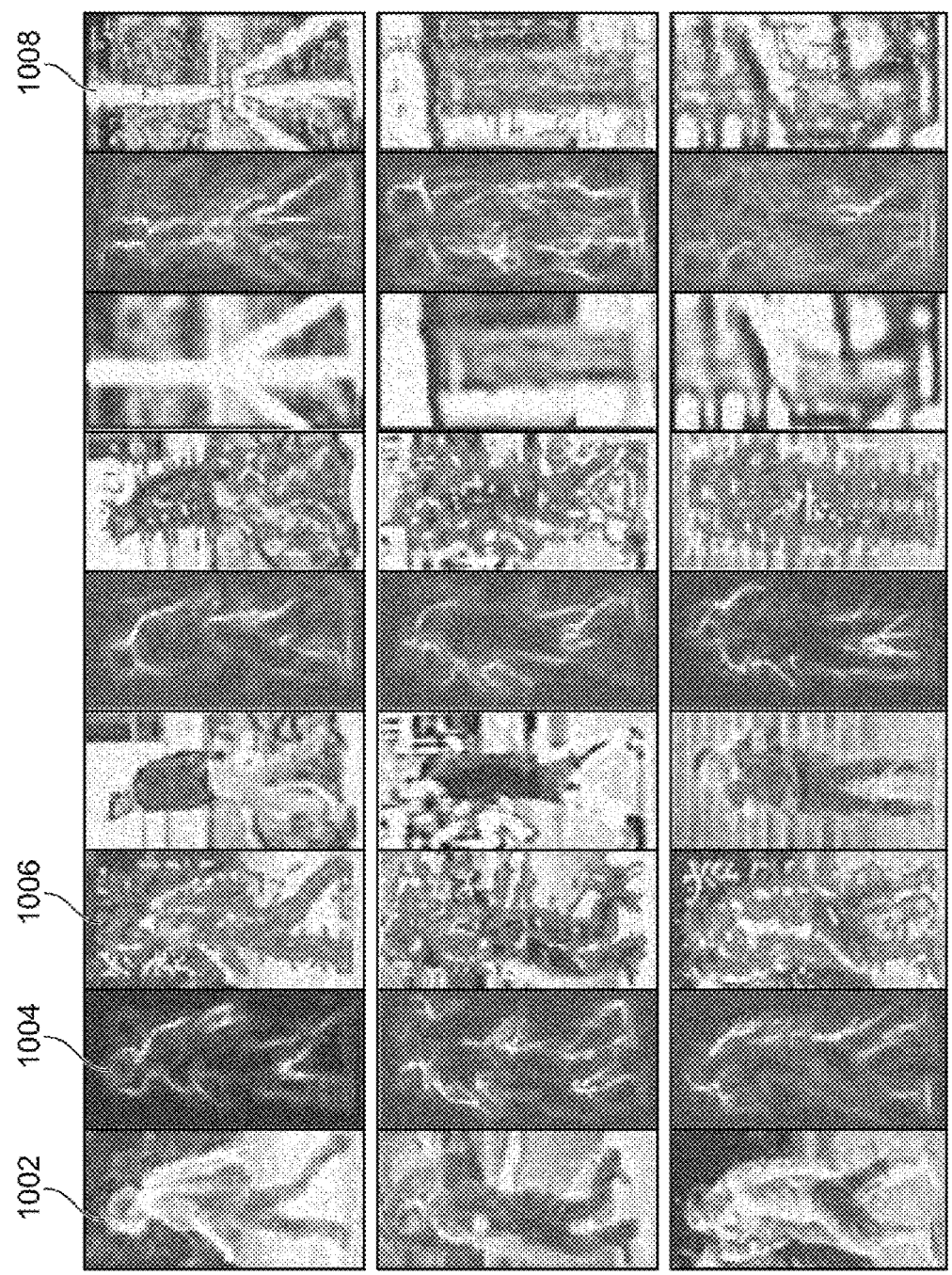
FIG. 10 shows examples of foreground masks imposed on pedestrians and negative patches.

FIG. 10 shows examples of foreground masks imposed on pedestrians and negative patches. Alternating sets of three images 1002, 1004, 1006 display the original image, a foreground mask generated from local part templates, and the resulting edge filtering, respectively. The right column 1008 shows the results for negative data. Note that local contour parts can capture global body contours at various poses from its combinations. From FIG. 10, a person skilled in the art would appreciate that for pedestrian images, the method of FIG. 8A refines ROI positions in addition to matching local body parts and can enhance underlying body contours.

The method of FIG. 8A produces efficient and reliable performance on relatively high resolution pedestrian ROIs. However, as a pedestrian ROI size becomes smaller, contour extraction and matching steps may become fragile for low-resolution images. Thus, at greater distances beyond a predetermined threshold (i.e., of pedestrian ROIs<35 pixel), an HOG classifier is employed.

For candidate ROIs (pedestrians) located at greater distances beyond a predetermined threshold, a cascade of HOG based classifiers is employed. HOG-based classifiers have been proven to be effective for relatively low-resolution images when body contours are distinguishable from the background. Each HOG classifier is trained separately for each resolution band. For this purpose, in the training phase, Gaussian smoothing and sub-sampling are applied to match the target image resolution (e.g., 25 pixels at 25 m and 17 pixels at 35 m for nominal pixel heights for these distance interval).

Note that at further distances, image contrast is reduced as pedestrian ROI size becomes smaller. To compensate for this and also to meet scene dependent low-light conditions, a histogram normalization step is employed that is based on histogram stretching. For each ROI, local histogram stretching is applied wherein the top 95% of the gray value histogram range is linearly extended to cover 255 gray levels. In contrast to employing histogram normalization, histogram stretching does not produce artifacts at low contract images, yet may enhance underlying contours.

To evaluate the performance of the above described method for detecting pedestrians, a number of experiments were performed using an exemplary system setup and an input dataset. The experimental system comprises a stereo rig that includes off-the-shelf monochrome cameras and a commercial stereo processing board that runs on a multi-core PC platform. The cameras are of standard NTSC automotive grade of 720×240 resolution with a 46° field of view.

To evaluate system performance, a number of data sequences were captured and ground-truthed under various urban driving scenarios. The testing data included, for example, sequences of people crossing a road, cluttered intersections, as well as people darting out from between parked vehicles. In total, 18 sequences comprising a total of 4000 frames were captured.

Figure 11A:
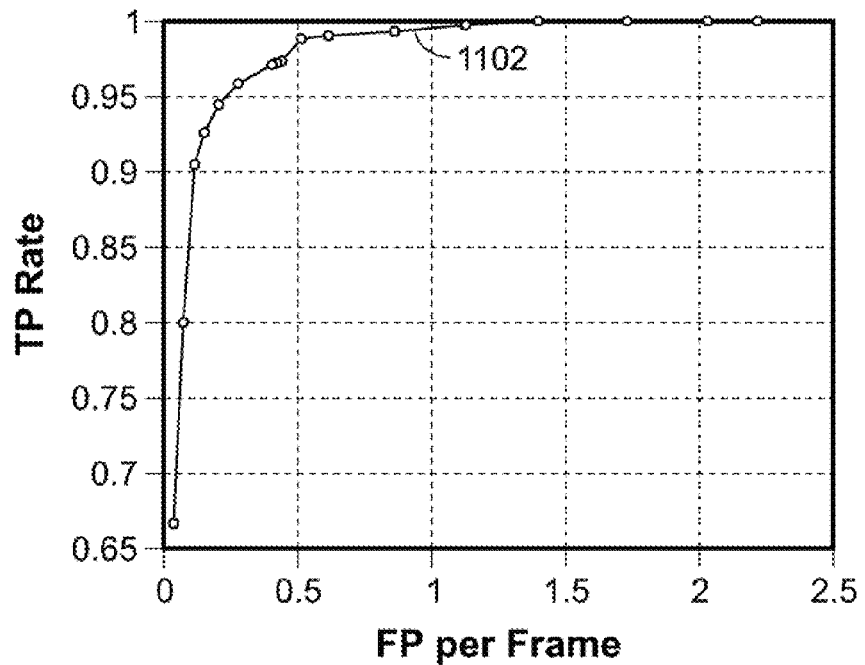
FIG. 11A is a graph depicting a detection rate and false positive per frame for a combination of PD (stereo-based detector) and PC (image-based classifier) vs. PD, PC and scene labeling.

The system was evaluated by comparison with hand-marked ground-truthed data. For detailed evaluation, the performance was analyzed based on factors that include (1) overall system performance, (2) performance comparisons at different distance bands, (3) zone-based (head-on vs. lateral) performance analysis, and (4) the performance of each classification module. FIG. 11A shows an ROC (Receiver Operating Characteristic) curve 1102 for overall system performance. The average performance of the system was about a 90% detection rate with 0.23 false positives per frame. This is equivalent or better than performance reported from most state of art pedestrian detection systems.

Figure 11B:
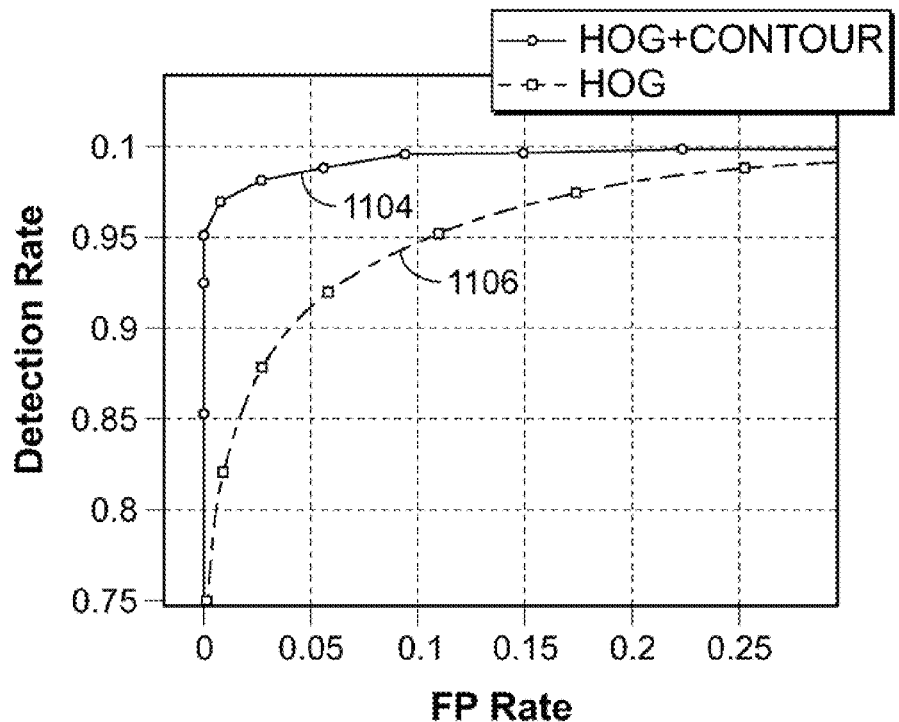
FIG. 11B is a graph depicting system performance with respect to distance range.

FIG. 11B displays ROC curves for the first level Contour+HOG classifier 1104 and higher level HOG-based classifiers 1106 evaluated for high resolution image examples. The Contour+HOG classifier shows more robust and stable performance over HOG classifiers alone in terms of detection and false positive rejections.

Figure 12A:
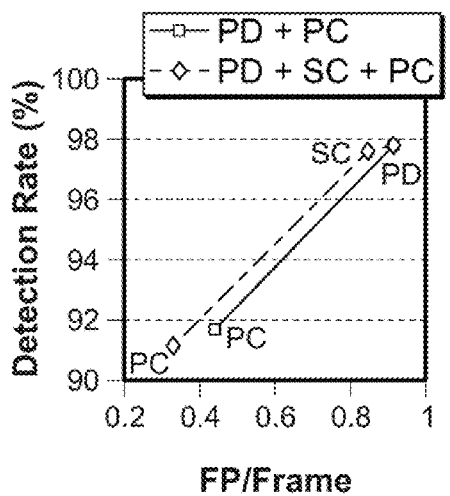
FIG. 12A is a plot of an ROC curve of experimental system performance.
Figure 12B:
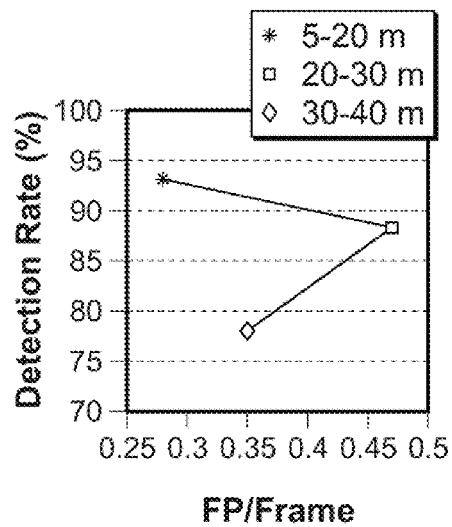
FIG. 12B is a plot of an ROC curve for experimental Contour+HOG vs. HOG classification evaluated on high-resolution pedestrian images (of >35 pixel height)
Figure 12C:
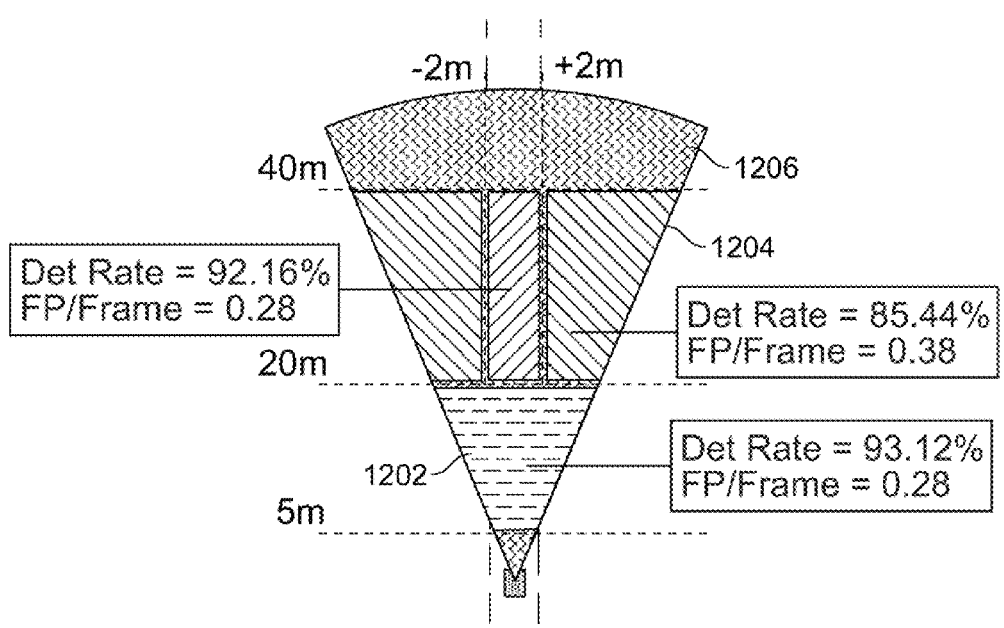
FIG. 12C is a diagram visually depicting zone classification and performance.

FIGS. 12A-12C depict system performance based on different criteria. System performance was analyzed in terms of different distance intervals, which permit gauging the effectiveness of the system from an application point of view: low latency and high accuracy detection at short distances as well as distant target detection of potential threats of collisions. The system performance based on different distance ranges is shown in FIG. 12B. The system performs most accurately in the distance range of [5, 20] m with 93% detection rate (TP) and 0.28 false positives per frame (FPPF), which is most important from an application viewpoint. The results may be attributed to the use of a classifier layer based on contour, since stereo-based detection and scene labeling performs evenly well across distance changes.

As the distance of a pedestrian from a vehicle increases, performance degrades. More particularly, the TP rate drops by 5% and 11%, respectively, with an increasing false alarm rate. Note that the substantial drop of TP rate at [30, 40] m is due primarily to the reduced resolution of the target image ROI of an average of 20 pixel height. On the other hand, the slightly increased FPPF at the middle band can be ascribed to scene dependent increased clutter at a corresponding distance range.

Performance was further analyzed in terms of another criteria that determines effectiveness for collision avoidance purposes. Referring to FIG. 12C, an image was divided into three zones that cover (a) [5, 20] m imminent collisions ($Z_f$) (1202), (b) head-on regions of laterally ±2 m above 20 m ($Z_h$) (1204), and (c) outside head on regions ($Z_l$) (1206). FIG. 12C visualizes these zones and performance for each zone. The performance shows accuracy on the order of (1) proximity ($Z_f$), (2) head-on ($Z_h$), and lateral regions ($Z_l$).

Referring to FIG. 12A, the plot in FIG. 12A shows how the various layers in the system help achieve a high performance level. Ideally, as input is passed through each component, it is desirable to maintain the same detection rate while progressively reducing false positives. The stereo based detector achieves a detection rate of 97% at a FP rate of 10 per frame, which is substantially reduced by the structure classification block to about 2 per frame without substantially affecting the detection rate. The image-based classifiers reduce this further to about one per frame and 0.4 per frame, respectively.

Overall, one of the most significant performance improvements over other approaches is due to the use of a stereo-based structure classification method. Such a method works complementarily with image-based steps, where it can prune out significant amounts of scene parts with structural cues, which may be quite challenging for other classification layers of a different modality. In addition, such a method provides refined input to the upper layers such that a confined (or bounded) class of objects are filtered out and presented to the next layer, which includes trees, poles and building patches of structurally conformal shape with pedestrians.

Figure 13:
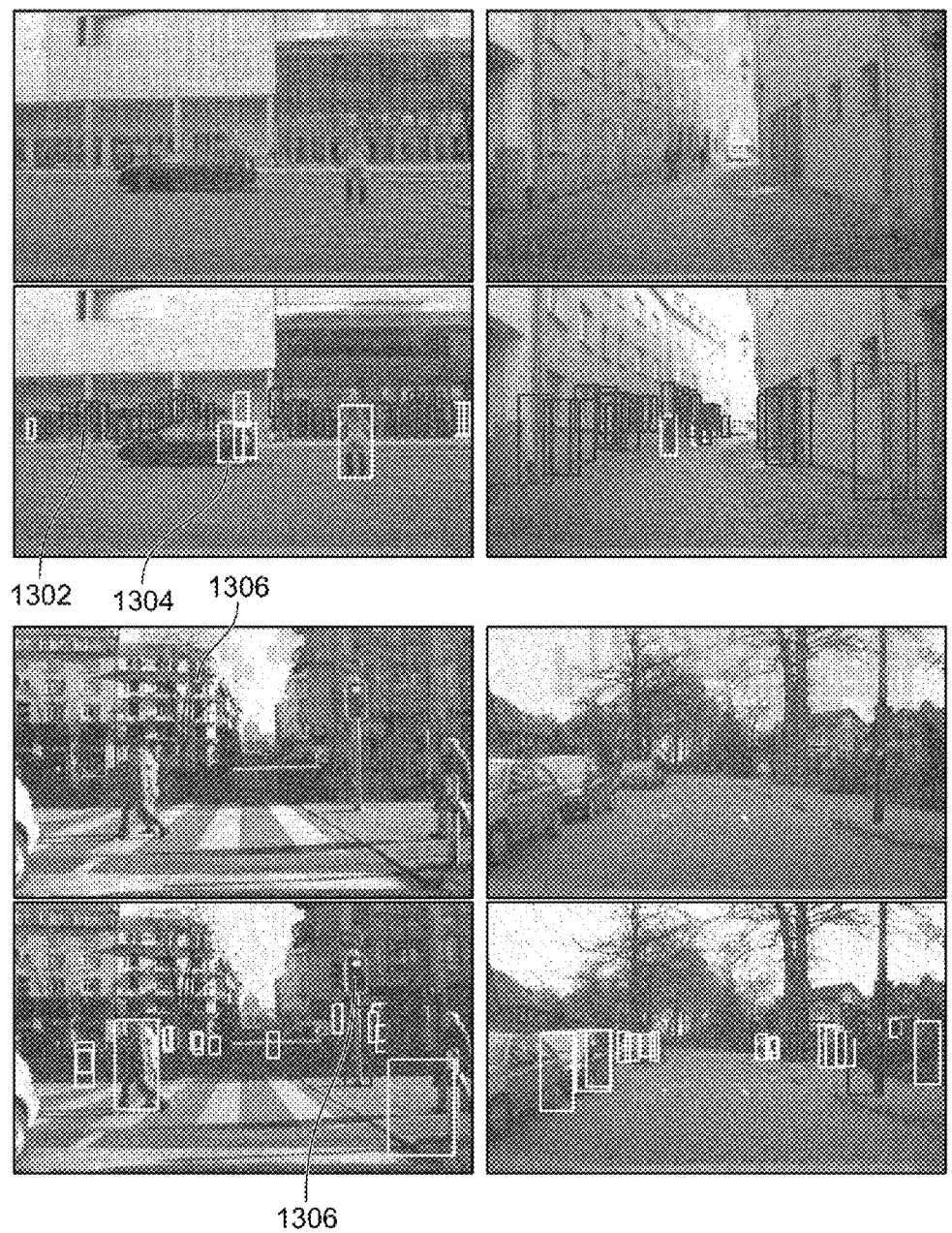
FIG. 13 visually depicts experimental examples of structure classification (SC)

In fact, the experimental data show the advantage of pruning the most difficult cases for image-based classifiers. Some of these difficult cases are shown in FIG. 13. FIG. 13 depicts example images using SC. The first row of images shows scene labeling for a variety of examples. In the second row, the input boxes (from PD) are denoted as reference 1302 if they are rejected by SC and reference 1304 otherwise. In these cases, there has been a reduction in the fp/frame numbers by as much as 80% to 90%. In third and fourth column of FIG. 13, the traffic post and trees are labeled as reference 1306 correctly, thus removing the initial detections of these objects before the classifier stage commences. In the fourth column, the overhanging tree branches are correctly labeled without missing the objects directly under. The inaccuracies in stereo depth and the patch quantization may lead to a mislabeling of pedestrians that are too close to vertical structures. This, however, is not a serious issue since the labeling corrects itself as the host vehicle moves closer to the pedestrian.

Figure 14:
FIG. 14 shows visual examples of experimental pedestrian classification results.

FIG. 14 shows visual examples of experimental pedestrian classification results. White boxes (1402) denote the output of the stereo based pedestrian detection (PD+SC). Red boxes (1404) denote the final pedestrian classifications. The bottom-right image (1406) denotes an example of a failure of the experimental system in detecting the furthest pedestrian. Note for the experimental system there are successful detections at all but the furthest distance in relatively complex areas.

Figure 15A:
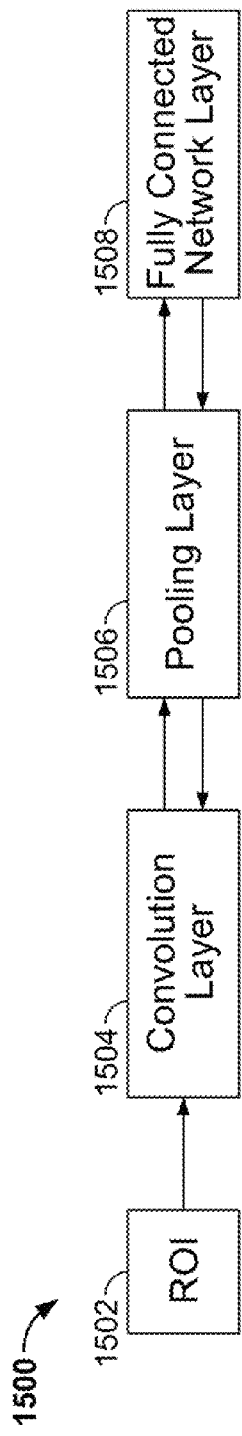
FIG. 15A is a block diagram of an alternative embodiment of the PD module of FIG. 3 that employs a cascade of classifiers comprising a multi-layer convolutional network.

Referring again to FIG. 3, block S6, the classification scheme employed in the cascade of classifiers tuned for several depth bands that comprises the pedestrian classification (PC) module may be replaced with other types of classification schemes without departing from the spirit of the present invention. According to an embodiment of the present invention, the PC module may comprise a cascade of classifiers tuned for a plurality of depth bands and trained on a filtered representation of data within the portion of candidate ROIs. The filtered representation may be, for example, based on deep learning classifiers. The deep learning classifiers may form a multi-layer convolutional network as shown in FIG. 15A.

The input ROI 1502 to the multi-layer convolutional network 1500 may be preprocessed before propagation through the network 1500, according to an embodiment of the present invention. In a preferred embodiment, the input ROI 1502 may comprise an 80×40 pixel block. Contrast normalization is applied to the input ROI 1502. Each pixel's intensity is divided by the standard deviation of the surrounding neighborhood pixels (e.g., a 7×7 pixel neighborhood). This preprocessing step increases contrast in low-contrast regions and decreases contrast in high-contrast regions.

Figure 15B:
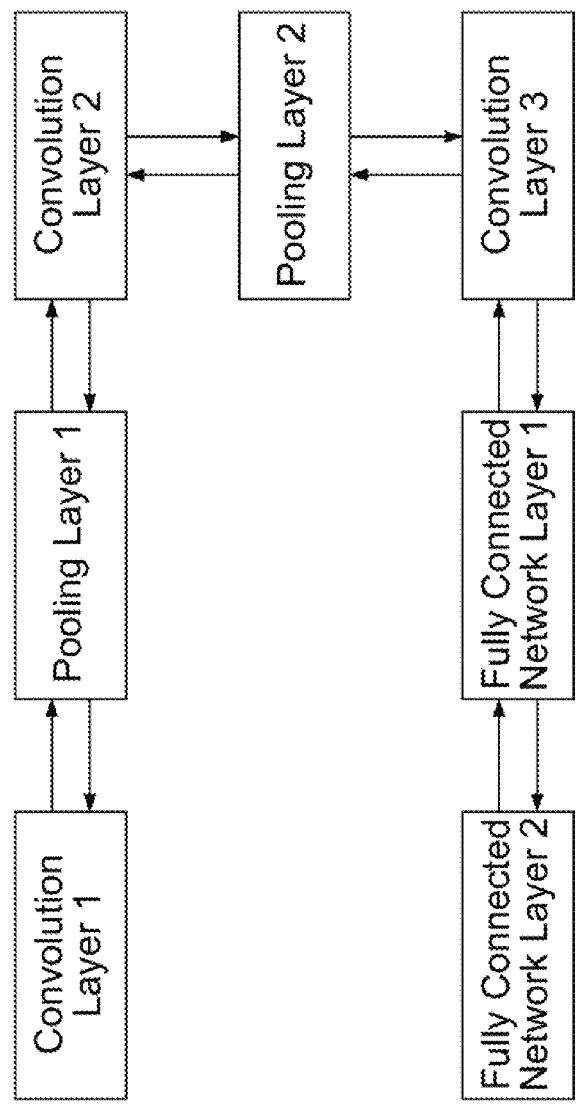
FIG. 15B is a preferred implementation of the multi-layer convolutional network of FIG. 15A.

According to one embodiment, the multi-layer convolutional network 1500 may comprise at least one each of a convolution layer 1504, a pooling layer 1506, and a fully connected network layer 1508. In a preferred embodiment, the multi-layer convolutional network 1500 comprises 7 trainable layers comprising 3 convolutional layers, 2 pooling layers, and 2 fully connected network layers, arranged as shown in FIG. 15B according to the following sequence: convolutional layer 1, pooling layer 1, convolutional layer 2, pooling layer 2, convolutional layer 3, fully connected network layer 1, and fully connected network layer 2.

As used herein, the convolutional layer applies a set of learned filters to the input ROI 1502 using a sliding-window convolution. The result of each convolution is combined with a learned bias and then passed through a non-linear function (e.g., the hyperbolic tangent). The purpose of the convolutional layer 1504 is to extract features from the input ROI 1502.

As used herein, the pooling layer 1506 combines input features within fixed neighborhoods using an averaging function followed by a coefficient multiplier and additive bias. The purpose of the pooling layer is to reduce computational complexity while increasing invariance.

As used herein, the fully connected layer 1508 includes a set of hidden nodes, each of which has a single trainable weight for each input feature.

Training the convolutional network is a stochastic process, during which a set of labeled ROIs 1602 is shuffled and iterated. Each of the labeled ROIs 1502 is forward propagated and then backward propagated though the network 1500, after which trainable parameters are adjusted, and then the forward and reverse propagation is repeated until parameters converge (i.e., the difference between each of the present and previous parameter falls below a predetermined threshold). As used herein, forward propagation refers to the process of passing an ROI 1502 through each of the 7 layers, resulting in 2 scores which correspond to two classes: 'pedestrian' and 'non-pedestrian'. Backward propagation refers to the process of computing an error (e.g., the squared L2 norm) between the scores obtained by forward propagation and the supervised label for a given ROI 1502, then using that error to change the free parameters of each layer of the network 1500 in reverse order. The update for each trainable parameter in each layer is computed by gradient descent.

According to an embodiment of the present invention, the training process may be accelerated by using a small subset of labeled ROIs to estimate the second derivative with a diagonal Hessian, then adjusting the learning rate for each free parameter to speed training. As used herein, the term Hessian matrix (or simply the Hessian) is the square matrix of second-order partial derivatives of a function; that is, it describes the local curvature of a function of many variables.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer implemented method for detecting presence of one or more pedestrians in a vicinity of a vehicle, comprising the steps of:
   receiving imagery of a scene from at least one image capturing device;
   deriving a depth map from the imagery;
   detecting a plurality of pedestrian candidate regions of interest (ROIs) from the depth map by matching each of the plurality of pedestrian candidate ROIs with a 3D human shape model; and
   classifying at least a portion of the pedestrian candidate ROIs by employing a cascade of classifiers tuned for a plurality of depth bands and trained on a filtered representation of data within the portion of pedestrian candidate ROIs to determine whether at least one pedestrian is proximal to the vehicle.

2. The method of claim 1, wherein the filtered representation is a combination of pedestrian contour and gradient features.

3. The method of claim 1, wherein the filtered representation is based on deep learning classifiers.

4. The method of claim 3, wherein the deep learning classifiers form a multi-layer convolutional network.

5. The method of claim 1, wherein contour-based classifiers are employed for a depth of a candidate ROI closer than or equal to a predetermined distance and HOG-based classifiers are employed for a depth greater than the predetermined distance.

6. The method of claim 5, wherein the contour-based classifiers are each trained based on the steps of: dividing a candidate ROI into a plurality of sub-ROIs; refining each of the sub-ROIs by means of contour template matching to produce refined sub-ROIs; composing a foreground mask from contour template matching; and applying an HOG-based classifier to the sub-ROIs based on the refined sub-ROIs and the foreground mask.

7. The method of claim 6, wherein contour template matching is achieved by chamfer matching.

8. The method of claim 1, wherein the pedestrian candidate ROIs are pruned and labeled by classification into one of a plurality of human or non-human structures based in part on vertical support histograms.

9. The method of claim 8, wherein classification into one of a plurality of human or non-human structures comprises: creating a 2D grid of tiles along image coordinates; for each tile, fitting a patch grid from a planar total least squares estimate; rejecting patches as invalid from the patch grid that having less than a predetermined number of 3D points or having less than a predetermined number of inliers; rejecting patches as ground or below ground according to their position and normal direction; and classifying and labeling each of the remaining patches as one of a tall vertical structure, an overhanging structure, and a candidate based on the vertical support histograms.

10. The method of claim 1, wherein an output of matching each of the plurality of pedestrian candidate ROIs with a 3D human, shape model is a correlation score map.

11. The method of claim 10, wherein a plurality of peaks in the correlation score map is selected by non-maximal suppression.

12. The method of claim 11, wherein an area about each of the plurality of peaks of the correlation score map is projected into the image to obtain an initial pedestrian candidate ROI set.

13. The method of claim 12, wherein candidate ROIs corresponding to non-pedestrians are partially pruned from the initial pedestrian ROI candidate set by removing regions that have more than a predetermined percentage of overlap with existing detections.

14. The method of claim 13, wherein the partially pruned candidate ROIs are further pruned by examining a combination of depth and edge features of two individual pedestrian detections.

15. The method of claim 14, wherein examining a combination of depth and edge features of two individual pedestrian detections further comprises the steps of:
computing a Canny edge map for each pedestrian candidate ROI;
rejecting edge pixels that are further than a predetermined distance from an expected disparity;
obtaining a vertical projection of remaining edges, resulting in a 1D profile from which peaks are detected using mean-shift; at each detected peak, initializing a new pedestrian ROI and refined it horizontally and then vertically to obtain a centered bounding box about a pedestrian candidate ROI; and
removing any resulting overlapped pedestrian candidate ROIs from the initial pedestrian ROI candidate set.

16. The method of claim 1, wherein the plurality of depth bands is obtained at a plurality of disjoint image resolutions.

17. A non-transitory computer-readable medium comprising computer-executable instructions for detecting a presence of one or more pedestrians in a vicinity of a vehicle, the instructions configured for:
receiving a imagery of a scene from at least one image capturing device;
deriving a depth map from the imagery; detecting a plurality of pedestrian candidate regions of interest (ROIs) from the depth map by matching each of the plurality of pedestrian candidate ROIs with a 3D human shape model; and
classifying at least a portion of the pedestrian candidate ROIs by employing a cascade of classifiers tuned for a plurality of depth bands and trained on a filtered representation of data within the portion of pedestrian candidate ROIs to determine whether at least one pedestrian is proximal to the vehicle.

18. The computer-readable medium of claim 17, wherein the filtered representation is a combination of pedestrian contour and gradient features.

19. The computer-readable medium of claim 17, wherein the filtered representation is based on deep learning classifiers.

20. The computer-readable medium of claim 19, wherein the deep learning classifiers form a multi-layer convolutional network.

21. The computer-readable medium of claim 17, wherein contour-based classifiers are employed for a depth of a candidate ROI closer than or equal to a predetermined distance and HOG-based classifiers are employed for a depth greater than the predetermined distance.

22. The computer-readable medium of claim 21, wherein the contour-based classifiers are each trained based on the steps of: dividing a candidate ROI into a plurality of sub-ROIs; refining each of the sub-ROIs by means of contour template matching to produce refined sub-ROIs; composing a foreground mask from contour template matching; and applying an HOG-based classifier to the sub-ROIs based on the refined sub-ROIs and the foreground mask.

23. The computer-readable medium of claim 22, wherein contour template matching is achieved by chamfer matching.

24. The computer-readable medium of claim 17, wherein the pedestrian candidate ROIs are pruned and labeled by classification into one of a plurality of human or non-human structures based in part on vertical support histograms.

25. The computer-readable medium of claim 24, wherein classification into one of a plurality of human or non-human structures comprises: creating a 2D grid of tiles along image coordinates; for each tile, fitting a patch grid from a planar total least squares estimate; rejecting patches as invalid from the patch grid that having less than a predetermined number of 3D points or having less than a predetermined number of inliers; rejecting patches as ground or below ground according to their position and normal direction; and classifying and labeling each of the remaining patches as one of a tall vertical structure, an overhanging structure, and a candidate based on the vertical support histograms.

26. A system for detecting a presence of one or more pedestrians in a vicinity of a vehicle, comprising:
at least one image capturing device for receiving imagery of a scene;
at least one processor communicatively connected to the at least one image capturing device for: receiving the imagery of the scene from the image capturing device;
deriving a depth map from said imagery; detecting a plurality of pedestrian candidate regions of interest (ROIs) from the depth map by matching each of the pedestrian candidate plurality of ROIs with a 3D human shape model; and
classifying at least a portion of the pedestrian candidate ROIs by employing a cascade of classifiers tuned for a plurality of depth bands and trained on a filtered representation of data within the portion of pedestrian candidate ROIs to determine whether at least one pedestrian is proximal to the vehicle.

27. The system of claim 26, wherein the at least one image capturing device is two or more cameras, one or more LIDAR devices, one or more radar devices, one or more SONAR devices, Or one or more passive or active ranging devices.

* * * * *